(No Model.)
J. DUREL.
FILTER.
No. 292,631. Patented Jan. 29, 1884.
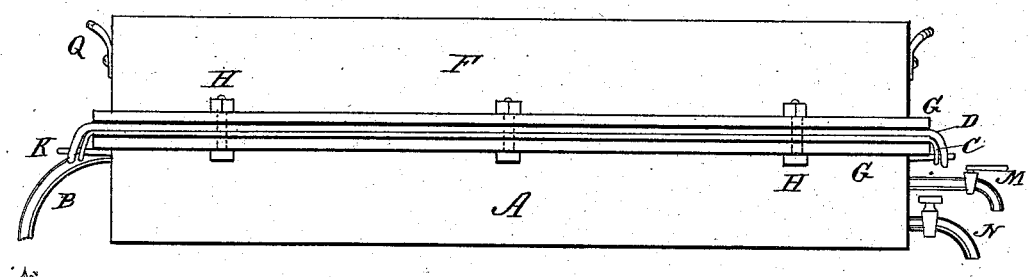
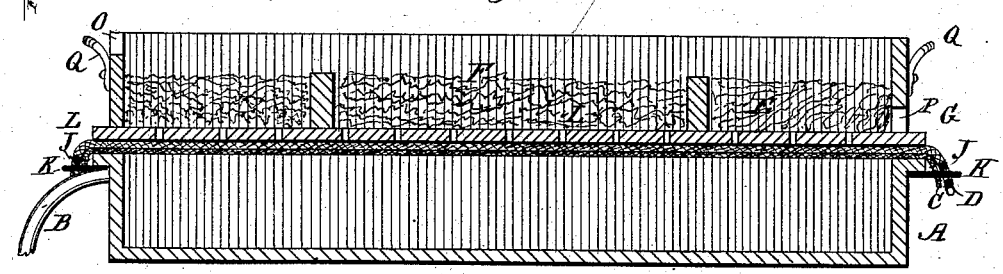
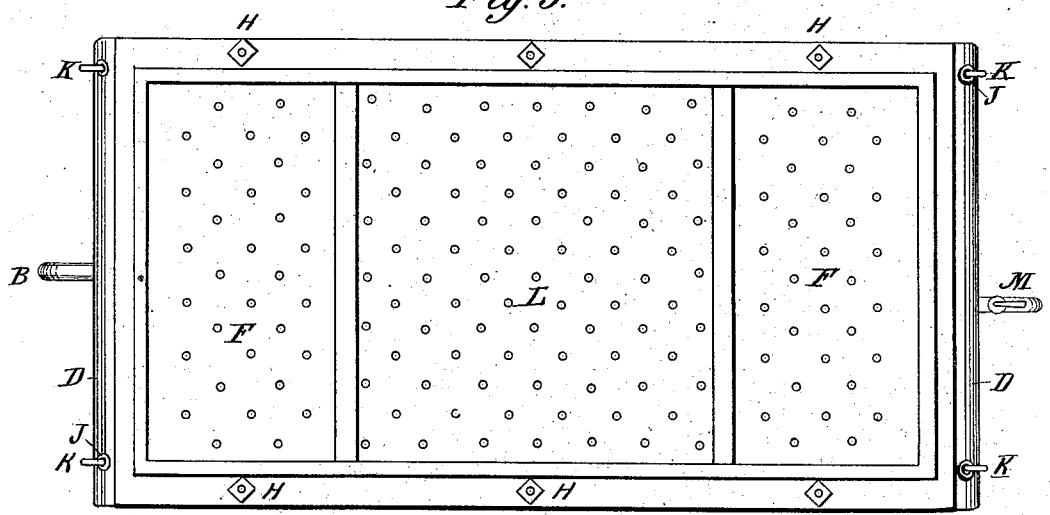
WITNESSES:
W. W. Hollingsworth
W. X. Havens.
INVENTOR:
Justin Durel
BY Munn & Co
ATTORNEYS.

United States Patent Office.

JUSTIN DUREL, OF NEW ORLEANS, LOUISIANA.

FILTER.

SPECIFICATION forming part of Letters Patent No. 292,631, dated January 29, 1884.

Application filed July 25, 1883. (No model.)

*To all whom it may concern:*

Be it known that I, JUSTIN DUREL, a citizen of the United States, residing at New Orleans, in the parish of Orleans and State of Louisiana, have invented a new and useful Improvement in Filters, of which the following is a specification.

My invention relates to that class of filters used for filtering cane-juice and sirup in the manufacture of sugar on plantations, the fluid to be filtered being forced through the filter by a force-pump or equivalent pressure; and the object of my invention is to provide means whereby the sediment and coarse matter may settle away from rather than into the filter proper, means for readily cleaning the filter, and means whereby the filter is made effective and economical.

To this end my invention consists in the construction and combination of parts, hereinafter described and claimed, reference being had to the accompanying drawings, in which—

Figure 1 is a side elevation, Fig. 2 is a longitudinal vertical section, and Fig. 3 is a plan view, of my invention.

A represents a tank of any suitable proportions—as, for instance, two feet wide, four feet long, and six inches deep—and of any suitable material, either wood or metal.

B is a pipe connecting with a force-pump, which supplies the liquid to be filtered under sufficient pressure to force the liquid, however thick and heavy it may be with foreign matter, to flow through the filter C D F, leaving said foreign matter to settle in the tank A.

F is another tank, similar to tank A, adapted to fit on top of it, the lower edges of tank F and the upper edges of tank A having flanges G, through which are holes to receive bolts H, to firmly bind the two tanks together.

C and D are filtering-cloths stretched over the lower tanks, and secured by means of eyelets J at their edges to hooks K on the edges of the tank. These cloths may be of any suitable material—such as fine cotton below and heavy duck above, or felt or wire-cloth. Each different fluid to be filtered may require some some special filter to produce the best result. In each case the filtering-cloths extend across the edges of the tank and are firmly held by the flanges and bolts. At the same time the cloths serve as a packing for the joint between the two tanks to prevent the escape of fluid. The bottom L of the upper tank, F, is perforated with holes, usually from one-sixteenth to one-eighth of an inch in diameter, the size being dependent on the fineness of the filtering-cloth and the material to be filtered. The upper tank, F, may be partly filled with gravel, coal, moss, &c., if required, to assist in perfecting the filtration.

The pipe B of the force-pump enters the lower tank immediately below the filtering-cloths, so that the current of entering fluid may have a constant tendency to wash clogging material from the lower cloth, and so that water may be let in against the cloth to clean it.

M is a faucet, from which liquid may be drawn in preparing the lower tank from cleaning; and N is a faucet to discharge the muddy refuse which settles to the bottom.

O is the regular overflow or outlet gutter for the clarified liquid to escape from. P is a similar gutter that may be used in case there is no coal or other filtering material used in the upper tank. When such material is used, this outlet P will be closed. Q Q are handles by which the upper tank may be removed. By this means of forcing the fluid upward through the filter the sediment and coarse matter is left below to fall by its own gravitation out of the way of the filter.

The perforated bottom to the upper tank may be dispensed with when the fluid requires but little pressure to force it through the cloth.

What I claim as my invention, and wish to secure by Letters Patent, is—

The combination, with the tank A, having flanges G, and provided with pins K, and the tank F, having similar flanges G and a perforated bottom, of the cloths C and D, provided with eyelets J to engage pins K, and the bolts H, as and for the purpose specified.

JUSTIN DUREL.

Witnesses:
A. G. LAPICE,
CONST. ANDRÉE.